US009429700B2

(12) United States Patent
Chiu et al.

(10) Patent No.: US 9,429,700 B2
(45) Date of Patent: Aug. 30, 2016

(54) BACKLIGHT MODULE

(71) Applicants: Wen-Yen Chiu, Hsin-Chu (TW);
Chang-Cheng Liu, Hsin-Chu (TW);
Min-Chun Chou, Hsin-Chu (TW);
Ching-Hsiang Li, Hsin-Chu (TW);
Chien-Hui Lee, Hsin-Chu (TW);
Guan-Wen Liu, Hsin-Chu (TW)

(72) Inventors: Wen-Yen Chiu, Hsin-Chu (TW);
Chang-Cheng Liu, Hsin-Chu (TW);
Min-Chun Chou, Hsin-Chu (TW);
Ching-Hsiang Li, Hsin-Chu (TW);
Chien-Hui Lee, Hsin-Chu (TW);
Guan-Wen Liu, Hsin-Chu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 47 days.

(21) Appl. No.: 14/645,419

(22) Filed: Mar. 11, 2015

(65) Prior Publication Data

US 2015/0268404 A1 Sep. 24, 2015

(30) Foreign Application Priority Data

Mar. 21, 2014 (CN) .......................... 2014 1 0106954

(51) Int. Cl.
*F21V 8/00* (2006.01)

(52) U.S. Cl.
CPC ............. *G02B 6/0036* (2013.01); *G02B 6/005* (2013.01); *G02B 6/0053* (2013.01); *G02B 6/0073* (2013.01)

(58) Field of Classification Search
CPC .. G02B 6/0036; G02B 6/005; G02B 6/0016; G02B 6/0035; G02B 6/0063; G02B 6/0053; G02B 6/0073; G02B 6/0018; G02F 2001/133607; G02F 1/133606; G02F 1/133615
See application file for complete search history.

(56) References Cited

U.S. PATENT DOCUMENTS

| 7,364,341 | B2 | 4/2008 | Parker et al. | |
|---|---|---|---|---|
| 8,430,552 | B2 * | 4/2013 | Lin | G02B 6/0038 349/65 |
| 8,511,881 | B2 * | 8/2013 | Hu | G02B 6/0036 362/355 |
| 8,529,116 | B2 * | 9/2013 | Tsai | G02B 6/0036 315/39 |
| 9,329,328 | B2 * | 5/2016 | Chen | G02B 6/0053 |

FOREIGN PATENT DOCUMENTS

| CN | 102155711 | 8/2011 |
|---|---|---|
| TW | M264503 | 5/2005 |
| TW | M264504 | 5/2005 |
| TW | I296694 | 5/2008 |
| TW | I301920 | 10/2008 |
| TW | I375822 | 11/2012 |
| TW | I388891 | 3/2013 |
| TW | I407162 | 9/2013 |
| TW | 201344307 | 11/2013 |

* cited by examiner

*Primary Examiner* — Bao Q Truong
(74) *Attorney, Agent, or Firm* — Jianq Chyun IP Office

(57) ABSTRACT

A backlight module including an LGP, an optical film, a first light source is provided. The LGP has a bottom surface, a light emitting surface, a first light incident surface, and microstructures. Each microstructure is recessed into or protrudes out of the bottom surface and includes at least two structural units. A section line of each structural unit on a first reference plane is a curve, and the curve has a peak point. A distance between two peak points of two adjacent structural units along a first direction is greater than 0 and smaller than a half of a total width of the two structural units along the first direction. Each microstructure has a symmetric plane perpendicular to the light emitting surface and the first light incident surface. The optical film is located on the light emitting surface. The first light source is located beside the first light incident surface.

26 Claims, 12 Drawing Sheets

BACKLIGHT MODULE

CROSS-REFERENCE TO RELATED APPLICATION

This application claims the priority benefit of China application serial no. 201410106954.0, filed on Mar. 21, 2014. The entirety of the above-mentioned patent application is hereby incorporated by reference herein and made a part of this specification.

BACKGROUND

1. Technical Field

The invention relates to an optical module. Particularly, the invention relates to a backlight module applied to a display device.

2. Related Art

Along with development of display technology, flat panel displays gradually replace conventional cathode ray tubes (CRTs) and become a main stream in display market. In the flat panel displays, liquid crystal displays (LCDs) are most popular. A general LCD is mainly composed of a backlight module and an LCD panel. Since the LCD panel is not luminous itself, the backlight module is used to provide a planar light source required for display.

Generally, the backlight modules are mainly divided into direct type backlight modules and side type backlight modules. Taking the side type backlight module as an example, the side type backlight module generally includes a light guide plate (LGP), a light source disposed at a light incident surface of the light guide plate and an optical film disposed at a light emitting surface of the light guide plate. Based on a total reflection principle, a light beam emitted by the light source is guided to the whole light guide plate after entering the light guide plate through the light incident surface. According to the existing technique, a plurality of microstructures are configured on a bottom surface of the light guide plate to spoil the total reflection of the light beam, such that the light beam emits out from the light emitting surface of the light guide plate. The light beam emitted from the light emitting surface further passes through the optical film disposed on the light guide plate to form the planar light source required by the display panel.

However, along with breakthrough of process technology, light emitting diodes (LEDs) gradually replace cold cathode fluorescent lamps (CCFL) to serve as the light source in the backlight module. According to the existing design, a plurality of LEDs are arranged beside the light incident surface of the light guide plate in intervals. However, light intensities of the LEDs serving as point light sources are not evenly distributed on the light incident surface, where regions on the light incident surface corresponding to the LEDs may form bright zones, and dark zones are formed on the light incident surface corresponding to regions between the LEDs, such that the planar light source output by the light guide plate may have a mura phenomenon. In other words, the side type backlight module using the LEDs as the light sources may have a problem of uneven emitted light in an actual application. Therefore, how to resolve the above problem is an important issue concerned by related technicians.

Taiwan Patent No. 1375822, M264503, 1296694, M264504 and Taiwan Patent Publication No. 201344307 respectively disclose a plurality of microstructures of the light guide plate, which are used for spoiling the total reflection of light to enhance a light usage rate. Taiwan Patent No. 1301920, 1388891, 1407162, China Patent No. 102155711 and U.S. Pat. No. 736,341 respectively disclose a plurality of microstructures of the light guide plate, which are used for improving light diffusibility and mitigating uneven light intensity and the mura phenomenon.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a backlight module having good light uniformity.

Other objects and advantages of the invention can be further illustrated by the technical features broadly embodied and described as follows.

In order to achieve at least one of the objects or other objects, an embodiment of the invention provides a backlight module including a light guide plate, at least one optical film and a first light source. The light guide plate has a bottom surface, a light emitting surface, a first light incident surface and a plurality of microstructures. The bottom surface is opposite to the light emitting surface. The first light incident surface is connected to the bottom surface and the light emitting surface. Each of the microstructures is recessed into or protrudes out of the bottom surface, and includes at least two structural units. A section line of each of the structural units on a first reference plane parallel to the first light incident surface is a curve, and the curve has a peak point. The peak point is a tangent point of the curve and a second reference plane parallel to the light emitting surface, and a distance between two peak points of two adjacent structural units of each microstructure along a first direction parallel to the first reference plane and the light emitting surface is greater than 0 and is smaller than a half of a total width of the two structural units along the first direction. Each of the microstructures has a symmetric plane perpendicular to the light emitting surface and perpendicular to the first light incident surface. The optical film is located on the light emitting surface. The first light source is located beside the first light incident surface.

In an embodiment of the invention, the light emitting surface has a non-visual area connected to the first light incident surface and a visual area connected to the non-visual area. The non-visual area is located between the first light incident surface and the visual area. The microstructures are at least located under the non-visual area.

In an embodiment of the invention, at least one microstructure is located under the visual area.

In an embodiment of the invention, the structural units of at least one microstructure includes a plurality of first structural units and at least one second structural unit, and the first structural units have a same size, and a size of the at least one second structural unit is different to the size of the first structural units.

In an embodiment of the invention, each of the microstructures has a first surface and a second surface, and the first surface and the second surface of at least one microstructure are located at two sides of the first reference plane.

In an embodiment of the invention, the second surface of at least one microstructure is asymmetric to the first surface thereof.

In an embodiment of the invention, a first included angle between the first surface of at least one microstructure and the second reference plane within the light guide plate is between 0 degree and 20 degrees, and a second included angle between the second surface and the second reference plane within the light guide plate is between 0 degree and 90 degrees.

In an embodiment of the invention, the first surface of the microstructure recessed into the bottom surface is located between the first light incident surface and the second surface, and the second surface of the microstructure protruding out of the bottom surface is located between the first light incident surface and the first surface.

In an embodiment of the invention, a section line of the first surface of at least one microstructure on a third reference plane perpendicular to the first light incident surface and perpendicular to the light emitting surface is a straight line, and a section line of the second surface on the third reference plane is a straight line or a curve.

In an embodiment of the invention, a section line of the first surface of at least one microstructure recessed into the bottom surface on the first reference plane has at least two depressions and at least one protrusion, and a section line of the first surface of at least one microstructure protruding out of the bottom surface on the first reference plane has at least two protrusions and at least one depression.

In an embodiment of the invention, a section line of the first surface of the at least one microstructure on the second reference plane has at least two protrusions and at least one depression, and a section line of the second surface of the at least one microstructure on the second reference plane has at least two protrusions and at least one depression.

In an embodiment of the invention, the first surface of the at least one microstructure is connected to the second surface thereof.

In an embodiment of the invention, at least one microstructure has a connection surface. The connection surface is connected between the first surface and the second surface, and a section line of the connection surface on a third reference plane perpendicular to the first light incident surface and perpendicular to the light emitting surface is a straight line or a curve, a section line of the connection surface of at least one microstructure recessed into the bottom surface on the first reference plane has at least two depressions and at least one protrusion, and a section line of the connection surface of at least one microstructure protruding out of the bottom surface on the first reference plane has at least two protrusions and at least one depression.

In an embodiment of the invention, a length of the connection surface along a second direction perpendicular to the first light incident surface is between 0 μm and 20 μm.

In an embodiment of the invention, the first surface and the second surface of each of the microstructures respectively include a plurality of curved surfaces connected to each other, and the first surface and the second surface respectively have a symmetric surface perpendicular to the light emitting surface and perpendicular to the first light incident surface.

In an embodiment of the invention, the light guide plate further includes a second light incident surface. The second light incident surface is opposite to the first light incident surface, and the second light incident surface is connected to the bottom surface and the light emitting surface. The backlight module further includes a second light source located beside the second light incident surface. The light emitting surface has a visual area and a non-visual area connected to the visual area. The non-visual area surrounds the visual area, where the first surface of the microstructure located between the first light incident surface and the visual area and recessed into the bottom surface is located between the first light incident surface and the second surface, and the second surface of the microstructure located between the first light incident surface and the visual area and protruding out of the bottom surface is located between the first light incident surface and the first surface, and the first surface of the microstructure located between the second light incident surface and the visual area and recessed into the bottom surface is located between the second light incident surface and the second surface, and the second surface of the microstructure located between the second light incident surface and the visual area and protruding out of the bottom surface is located between the second light incident surface and the first surface.

In an embodiment of the invention, sizes of the microstructures are increased from the first light incident surface along a direction from the first light source to the first light incident surface.

In an embodiment of the invention, the first light source includes a plurality of light emitting diodes arranged along the first direction, and a distribution density of the microstructures located in front of each of the light emitting diodes is greater than a distribution density of the microstructures located in front of a gap between two adjacent light emitting diodes.

In an embodiment of the invention, the first light source includes a plurality of light emitting diodes arranged along the first direction, and a distribution density of the microstructures located in front of each of the light emitting diodes is smaller than a distribution density of the microstructures located in front of a gap between two adjacent light emitting diodes.

In an embodiment of the invention, the light guide plate further includes a lenticular lens structure located at the light emitting surface. The lenticular lens structure has a plurality of lenticular lenses parallel to each other, where a longitudinal direction of the lenticular lenses is perpendicular to the first light incident surface, and each of the lenticular lenses protrudes towards the optical film.

In an embodiment of the invention, the at least one optical film includes an inverse prism sheet. The inverse prism sheet has a substrate and a plurality of prisms parallel to each other, where a longitudinal direction of the prisms is parallel to the first direction, and each of the prisms is located between the light emitting surface and the substrate.

In an embodiment of the invention, a width of each of the structural units along the first direction is between 40 μm and 80 μm. A length of each of the structural units along a second direction perpendicular to the first light incident surface is between 60 μm and 80 μm. A thickness of each of the structural units along a third direction perpendicular to the light emitting surface is between 0 μm and 20 μm.

In an embodiment of the invention, a radius of curvature of the curve is between 70 μm and 210 μm.

In an embodiment of the invention, the at least one optical film includes a first prism sheet and a second prism sheet overlapped to the first prism sheet. The first prism sheet has a first substrate and a plurality of first prisms parallel to each other, where a longitudinal direction of the first prisms is parallel to the first direction. The second prism sheet has a second substrate and a plurality of second prisms parallel to each other, where a longitudinal direction of the second prisms is perpendicular to the first direction, and the first substrate is located between the first prisms and the second prism sheet. The second prisms are located between the second substrate and the first prism sheet.

In an embodiment of the invention, a width of each of the structural units along the first direction is between 40 μm and 60 μm. A length of each of the structural units along the second direction perpendicular to the first light incident surface is between 230 μm and 250 μm. A thickness of each of the structural units along a third direction perpendicular to the light emitting surface is between 0 μm and 20 μm.

In an embodiment of the invention, a radius of curvature of the curve is between 40 μm and 60 μm.

According to the above descriptions, in the backlight module of the invention, based on the design of symmetric concave and convex curved surfaces of each of the microstructures along the first direction, diffusibility and uniformity of light along the first direction are enhanced, so as to achieve good light uniformity.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
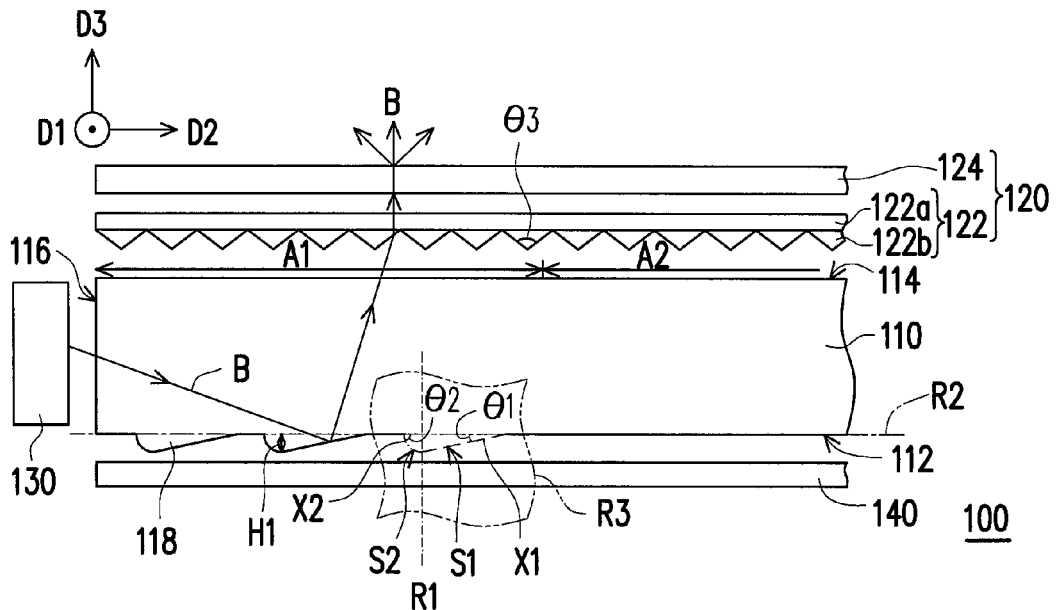
FIG. 1A is a partial cross-sectional view of a backlight module according to a first embodiment of the invention.
Figure 1B:
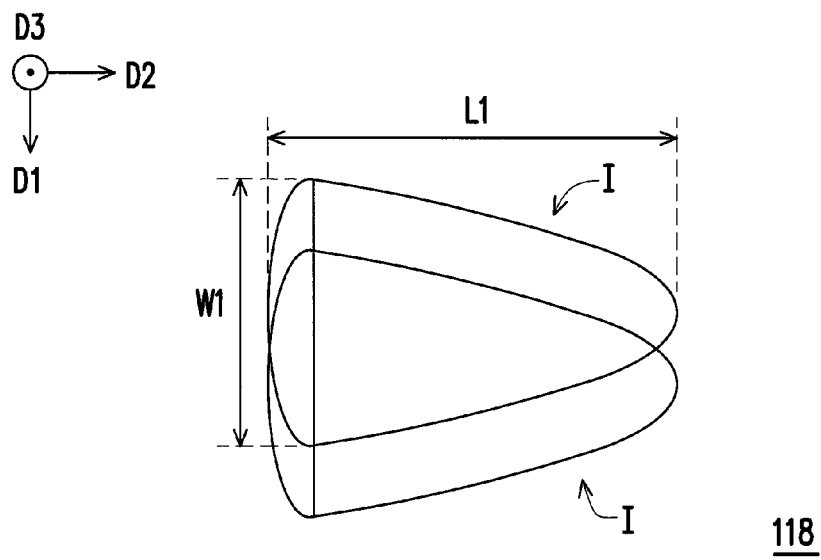
FIG. 1B is a decomposition view of one of microstructures of FIG. 1A.
Figure 1C:
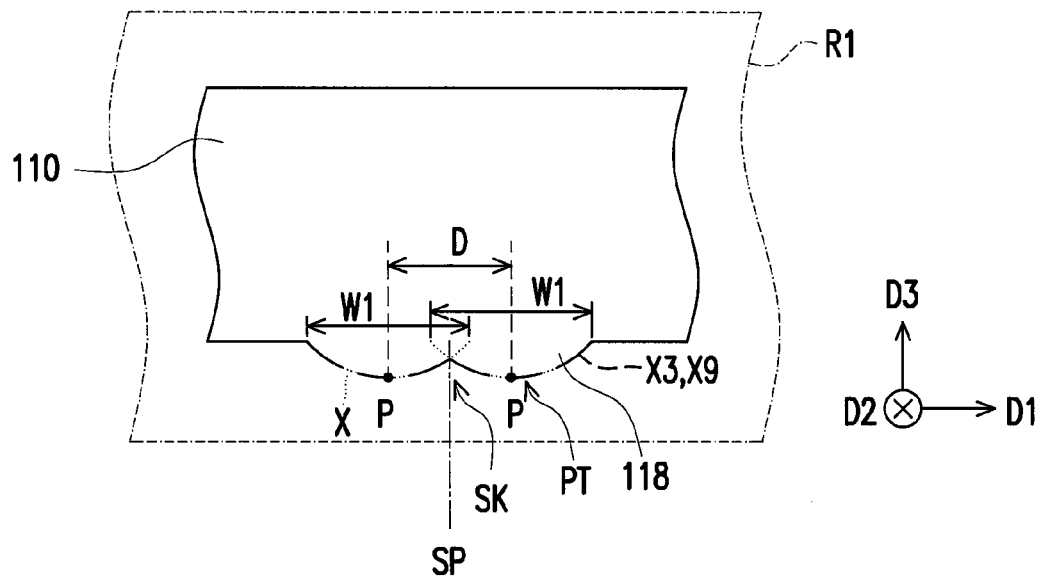
FIG. 1C is a partial cross-sectional view of a light guide plate of FIG. 1A on a first reference plane.
Figure 1D:
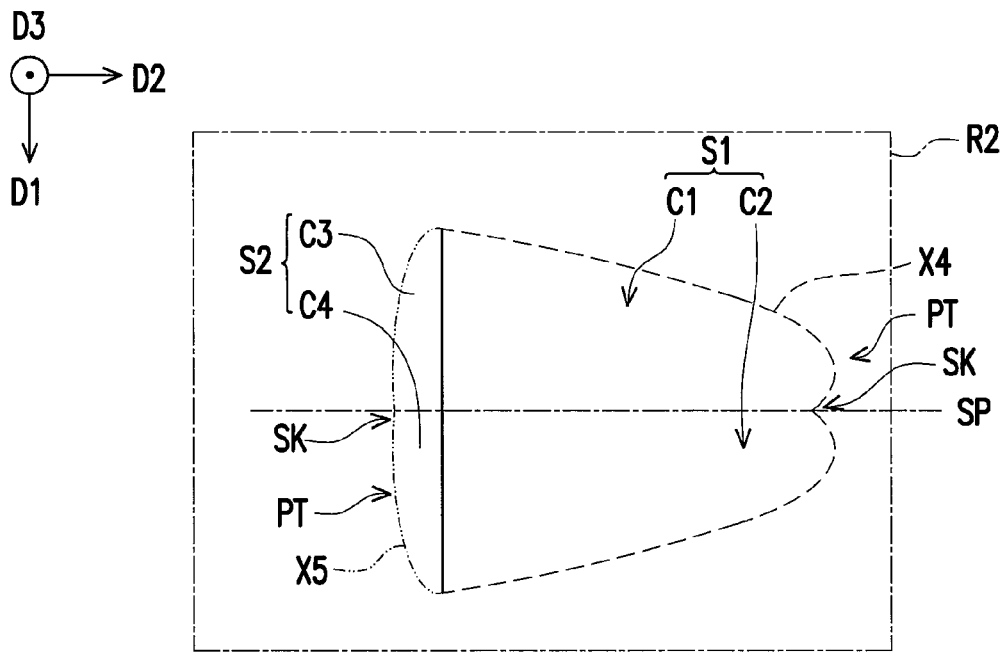
FIG. 1D is a top view of one of the microstructures of FIG. 1A.
Figure 1E:
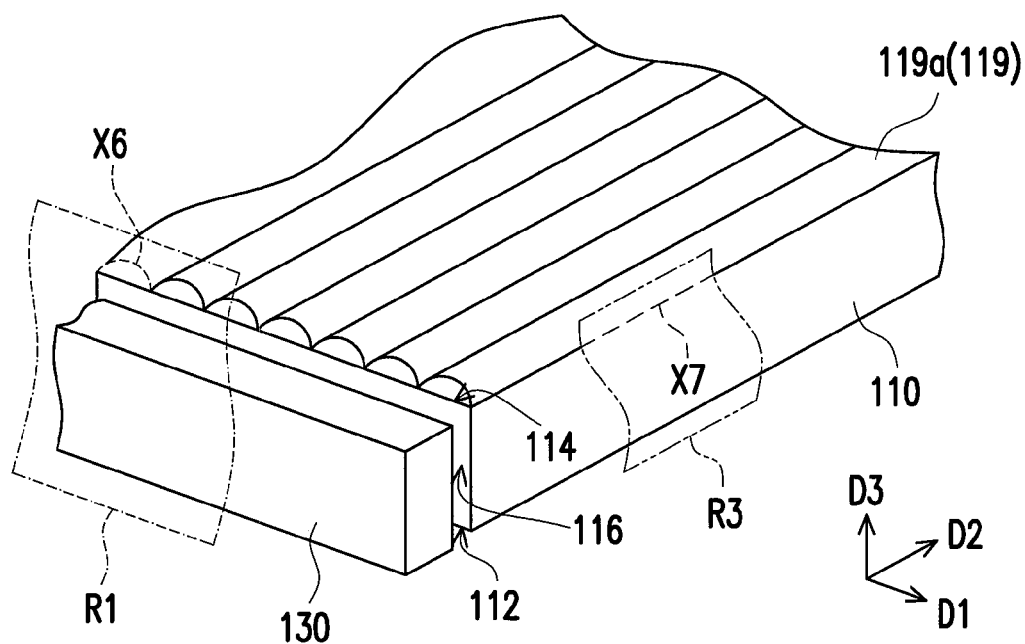
FIG. 1E is a partial three-dimensional view of a light guide plate having a lenticular lens structure and a first light source of FIG. 1A.
Figure 1F:
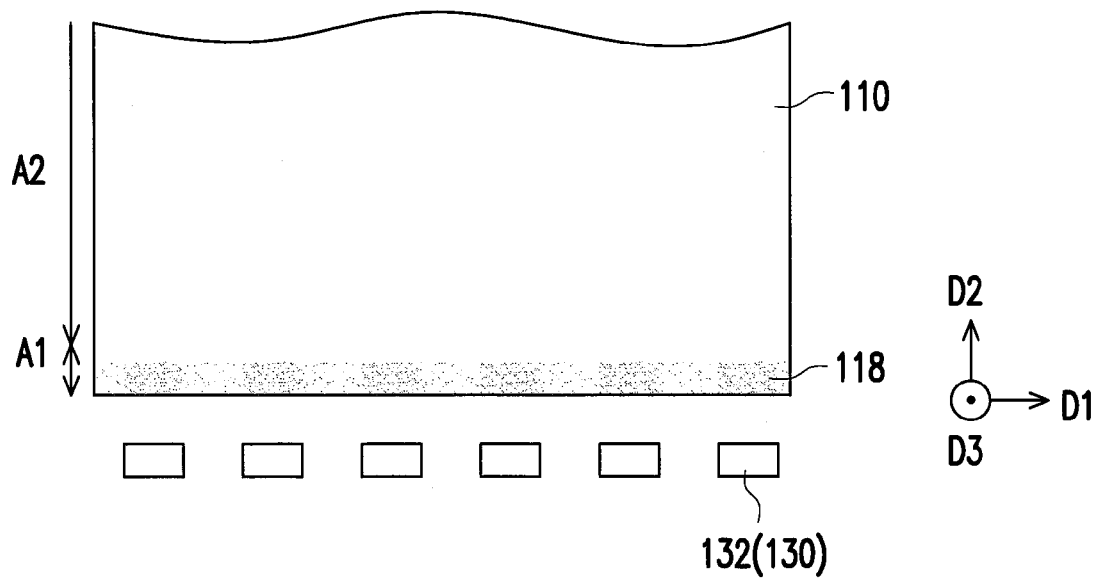
FIG. 1F is a partial top view of the backlight module of FIG. 1A.

FIG. 1A is a partial cross-sectional view of a backlight module according to a first embodiment of the invention. FIG. 1B is a decomposition view of one of microstructures of FIG. 1A. FIG. 1C is a partial cross-sectional view of a light guide plate of FIG. 1A on a first reference plane. FIG. 1D is a top view of one of the microstructures of FIG. 1A. FIG. 1E is a partial three-dimensional view of a light guide plate having a lenticular lens structure and a first light source of FIG. 1A. FIG. 1F is a partial top view of the backlight module of FIG. 1A, in which an optical film on the light guide plate of FIG. 1A is omitted.

Referring to FIG. 1A to FIG. 1F, the backlight module 100 includes a light guide plate 110, at least one optical film 120 and a first light source 130. The light guide plate 110 has a bottom surface 112, a light emitting surface 114, a first light incident surface 116 and a plurality of microstructures 118. The bottom surface 112 and the light emitting surface 114 are opposite and for example, parallel to each other. The first light incident surface 116 is connected to the bottom surface 112 and the light emitting surface 114. Each of the microstructures 118 is recessed into or protrudes out of the bottom surface 112. The microstructures 118 shown in FIG. 1A all protrude out of the bottom surface 112, though the invention is not limited thereto. The optical film 120 is located on the light emitting surface 114. The first light source 130 is located beside the first light incident surface 116, and the first light source 130 is used for emitting a light beam B to the first light incident surface 116.

In the embodiment, the backlight module 100 may further include a reflective sheet 140. The reflective sheet 140 is disposed under the bottom surface 112, and is used for reflecting the light beam B emitted out of the light guide plate 110 through the bottom surface 112 back to the light guide plate 110, so as to improve a light usage rate.

The light emitting surface 114 of the light guide plate 110 has a non-visual area A1 connected to the first light incident surface 116 and a visual area A2 connected to the non-visual area A1, where the non-visual area A1 is located between the first light incident surface 116 and the visual area A2. In other words, the non-visual area A1 is more closer to the first light incident surface 116 and the first light source 130 compared to the visual area A2, and a range of the non-visual area A1 and the visual area A2 shown in FIG. 1A is only an example, and the invention is not limited thereto. When a light intensity of the first light source 130 on the first light incident surface 116 is not uniformly distributed, the non-visual area A1 is liable to have a mura phenomenon that can be perceived by human eyes. Therefore, the microstructures 118 having a light diffusion effect are at least disposed under the non-visual area A1 to enhance diffusibility and uniformity of the light beam B under the non-visual area A1, so as to mitigate the mura phenomenon of the non-visual area A1 and an uneven dark and bright phenomenon at a boundary of the non-visual area A1 and the visual area A2 to effectively improve the optical performance of the backlight module 100. In another embodiment, the microstructures 118 can be disposed under the visual area A2 close to the non-visual area A1 to improve light emitting uniformity at the boundary of the non-visual area A1 and the visual area A2.

How the microstructures 118 improve the diffusibility and uniformity of the light beam B is introduced below. In detail, each of the microstructures 118 includes at least two structural units I. Moreover, a section line of each of the structural units I on a first reference plane R1 parallel to the first light incident surface 116 is a curve X, and the curve has a peak point P, where the peak point P is a tangent point of the curve X and a second reference plane R2 parallel to the light emitting surface 114. A distance D between two peak points P of two adjacent structural units I of each microstructure 118 along a first direction D1 parallel to the first reference plane R1 and the light emitting surface 114 is greater than 0 and is smaller than a half of a total width of the two structural units I along the first direction D1. Moreover, each of the microstructures 118 has a symmetric plane SP perpendicular to the light emitting surface 114 and perpendicular to the first light incident surface 116.

Further, each of the microstructures 118 of the embodiment includes, for example, two structural units I having the same shape and size, and the two structural unit I are partially overlapped along the first direction D1. Namely, the two structural units I are neither completely overlapped nor completely separated. Therefore, each of the microstructures 118 has an undulating design along the first direction D1. As shown in FIG. 1C, each of the microstructures 118 of the embodiment has two protrusions PT and one depression SK on the first reference plane R1. Compared to the microstructure composed of the single structural unit I, the microstructure 118 of the embodiment includes a plurality of structural units I partially overlapped to each other along the first direction D1. Therefore, each of the microstructures 118 has a plurality of light diffusing surfaces of different directions, and these light diffusing surfaces avail guiding the parallel light beam B to different directions, so as to improve the diffusibility of the light beam B. Moreover, since each of the microstructures 118 has the symmetric plane SP perpendicular to the light emitting surface 114 and perpendicular to the first light incident surface 116, the light beam B can be uniformly distributed in the light guide plate 110 after being incident to the microstructures 118.

It should be noticed that diffusion capability of the microstructure 118 can be changed by adjusting a radius of curvature of each curve X. The radius of curvature of each curve X can be different along with different optical film 120. For example, when the optical film 120 includes an inverse prism sheet 122, considering collocation of the light guide plate 110 and the inverse prism sheet 122 on a light emitting direction (to transmit most of the light beam B come from the first light incident surface 116 towards a direction away from the first light incident surface 116, and have a diffusion effect along the first direction D1), the radius of curvature of each curve X is, for example, between 70 µm and 210 µm. Moreover, a width W1 of each of the structural units I along the first direction D1 is, for example, between 40 µm and 80 µm, a length L1 of each structural unit I along the second direction D2 perpendicular to the first light incident surface 116 is, for example, between 60 µm and 80 µm, and a thickness H1 of each structural unit I along a third direction D3 perpendicular to the light emitting surface 114 is, for example, between 0 µm and 20 µm.

Each of the microstructures 118 has a first surface S1 and a second surface S2, and the first surface S1 and the second surface S2 of at least one microstructure 118 are located at two sides of the first reference plane R1. In the embodiment, the first surfaces S1 and the second surfaces S2 of all of the microstructures 118 are located at two sides of the first reference plane R1, and the second surface S2 of each microstructure 118 is located between the first light incident surface 116 and the first surface S1, and the first surface S1 of each microstructure 118 is connected to the second surface S2, though the invention is not limited thereto.

The first surface S1 and the second surface S2 of each microstructure 118 respectively include a plurality of curved surfaces connected to each other. As shown in FIG. 1D, the first surface S1 includes curved surfaces C1 and C2 connected to each other, and the second surface S2 includes curved surfaces C3 and C4 connected to each other, and the first surface S1 and the second surface S2 respectively have a symmetric plane (i.e. the symmetric plane SP) perpendicular to the light emitting surface 114 and perpendicular to the first light incident surface 116. In the embodiment, the second surface S2 and the first surface S1 of at least one microstructure 118 are not symmetric to each other. The second surfaces S2 and the first surfaces S1 of the microstructures 118 shown in FIG. 1A are all not symmetric to each other, though the invention is not limited thereto. In another embodiment, the second surface S2 and the first surface S1 of at least one microstructure 118 can also be symmetric to each other.

As shown in FIG. 1A, a section line X1 of the first surface S1 on a third reference plane R3 perpendicular to the first light incident surface 116 and perpendicular to the light emitting surface 114 is a straight line, and a section line X2 of the second surface S2 on the third reference plane R3 is a straight line or a curve. In the embodiment, the section line X2 of the second surface S2 on the third reference plane R3 is a curve, though the invention is not limited thereto. Moreover, a first included angle θ1 between the first surface S1 of each microstructure 118 and the second reference plane R2 parallel to the light emitting surface 114 within the light guide plate 110 is between 0 degree and 20 degrees, and a second included angle θ2 between the second surface S2 and the second reference plane R2 within the light guide plate 110 is between 0 degree and 90 degrees.

By designing the section line X1 of the first surface S1 on the third reference plane R3 as a straight line, directivity of the light beam B is enhanced, such that the light beam B reflected by the first surface S1 after entering the light guide plate 110 through the first light incident surface 116 can be transmitted to the light emitting surface 114 in a specific angle. The specific angle is determined according to the first included angle θ1 between the first surface S1 and the second reference plane R2 within the light guide plate 110. For example, when the optical film 120 includes the inverse prism sheet 122, the first included angle θ1 is designed to be between 0 degree and 20 degrees, which avails matching angles of the microstructures 118 and the inverse prism sheet 122 (with a vertex θ3 of 60-70 degrees). In this way, when the microstructures 118 are disposed under the light emitting surface 114 close to the visual area A2 or under the visual area A2, a forward light emitting rate of the light beam B is increased. Moreover, when the first included angle θ1 is too large, the light beam B come from the first light incident surface 116 may directly penetrate through the first surface S1 to reach the reflective sheet 140, and the light beam reflected by the reflective sheet 140 probably emits out of the light emitting surface 114 directly without being functioned (for example, diffused) by the microstructures 118. In this way, the effect of diffusing the light beam B cannot be achieved. Therefore, by designing the first included angle θ1 to be between 0 degree and 20 degrees, the light beam B is avoided to directly penetrate through the first surface S1.

Different aspects of the microstructures 118 are introduced below. As shown in FIG. 1C, a section line X3 of the first surface S1 of at least one microstructure 118 protruding out of the bottom surface 112 on the first reference plane R1 has at least two protrusions PT and at least one depression SK. Moreover, as shown in FIG. 1D, a section line X4 of the first surface S1 of at least one microstructure 118 on the second reference plane R2 parallel to the light emitting surface 114 has at least two protrusions PT and at least one depression SK, and a section line X5 of the second surface S2 of the at least one microstructure 118 on the second reference plane R2 has at least two protrusions PT and at least one depression SK.

Referring to FIG. 1A and FIG. 1E, in the embodiment of FIG. 1E, the light guide plate 110 may include a lenticular lens structure 119 on the light emitting surface 114 to decrease visibility of the microstructures 118. The lenticular lens structure 119 includes a plurality of lenticular lenses 119a parallel to each other, where a longitudinal direction of the lenticular lens 119a is perpendicular to the first light incident surface 116, and each of the lenticular lenses 119a protrudes towards the optical film 120 (shown in FIG. 1A). Further, a section line X6 of each of the lenticular lenses 119a on the first reference plane R1 is a curve, and a section line X7 of each of the lenticular lenses 119a on the third reference plane R3 is a straight line. However, the invention is not limited thereto, and in other embodiments, the section line X6 of each lenticular lens 119a on the first reference plane R1 can be a polyline, and the section line X7 of each lenticular lens 119a on the third reference plane R3 is a straight line.

Referring to FIG. 1F, the first light source 130 includes a plurality of light emitting diodes (LEDs) 132, and the LEDs 132 are arranged along the first direction D1. In the embodiment, a distribution density of the microstructures 118 located in front of each of the LEDs 132 is greater than a distribution density of the microstructures 118 located in front of a gap between two adjacent LEDs 132, though the invention is not limited thereto. In another embodiment, the distribution density of the microstructures 118 located in front of each of the LEDs 132 is smaller than the distribution density of the microstructures 118 located in front of the gap between two adjacent LEDs 132.

Figure 2A:
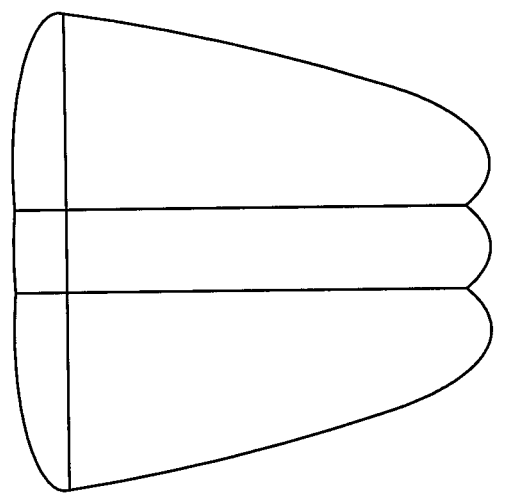
FIG. 2A is a schematic diagram of another type of the microstructure of FIG. 1A.
Figure 2B:
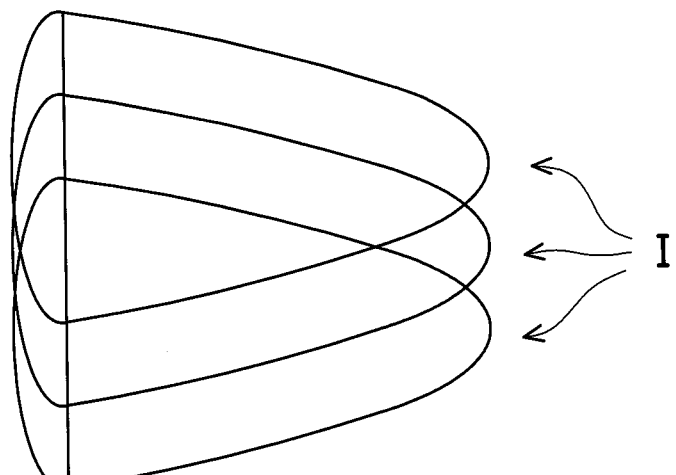
FIG. 2B is a decomposition view of the microstructure of FIG. 2A.
Figure 3:
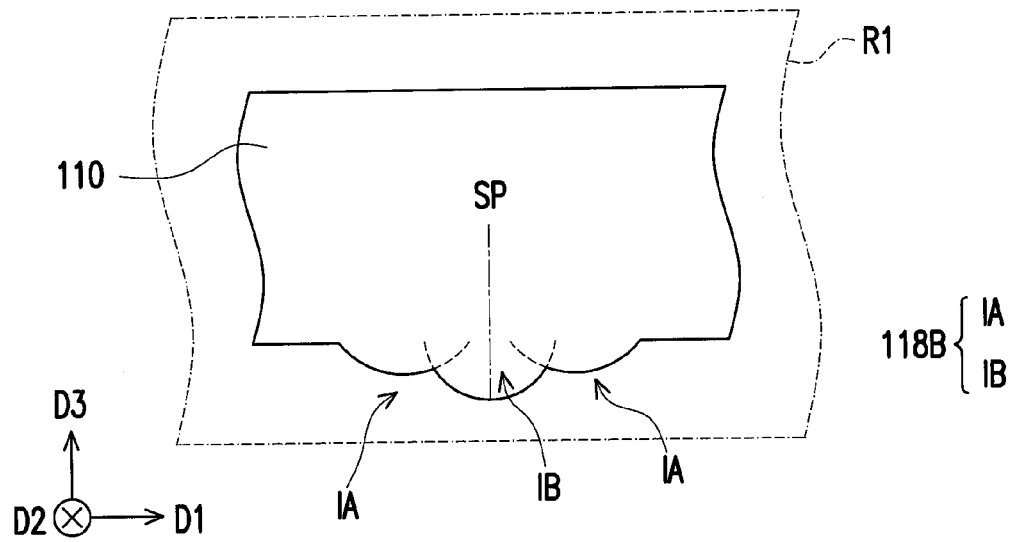
FIG. 3 is a partial cross-sectional view of another type of the microstructure of FIG. 1A on the first reference plane.
Figure 4:
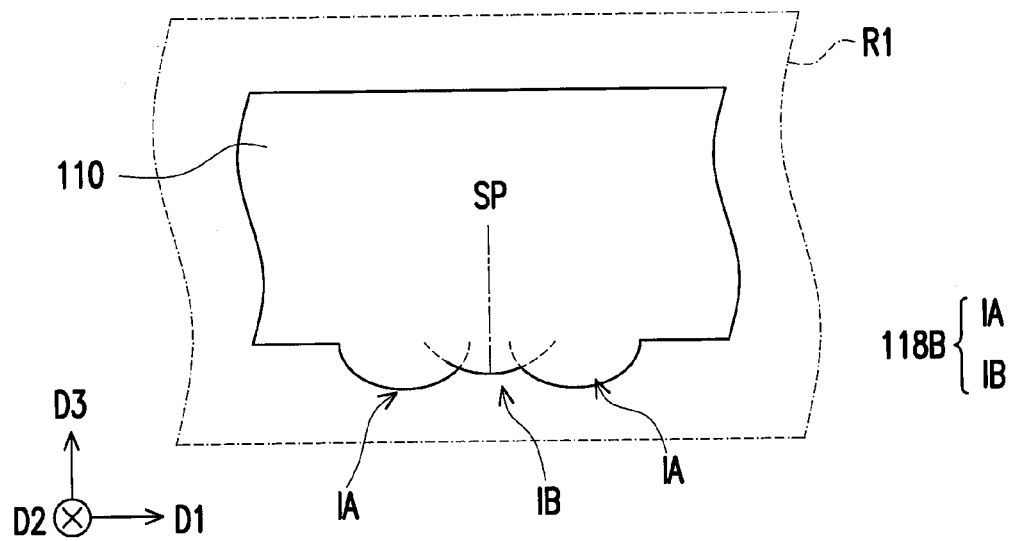
FIG. 4 is a partial cross-sectional view of still another type of the microstructure of FIG. 1A on the first reference plane.

In the aforementioned embodiment, each of the microstructures 118 includes two structural units I having the same shape and size, though the invention is not limited thereto. FIG. 2A is a schematic diagram of another type of the microstructure of FIG. 1A. FIG. 2B is a decomposition view of the microstructure of FIG. 2A. FIG. 3 is a partial cross-sectional view of another type of the microstructure of FIG. 1A on the first reference plane. FIG. 4 is a partial cross-sectional view of still another type of the microstructure of FIG. 1A on the first reference plane. Referring to FIG. 2A and FIG. 2B, at least one microstructure 118A includes three structural units I having the same shape and size. Alternatively, as shown in FIG. 3 and FIG. 4, the at least one microstructure 118B includes a plurality of first structural units IA and at least one second structural unit IB, where the first structural units IA have a same size, and a size of the second structural unit IB is different to the size of the first structural units IA. As shown in FIG. 3, the size of the second structural unit IB can be greater than the size of the first structural units IA. Alternatively, as shown in FIG. 4, the size of the second structural unit IB can be smaller than the size of the first structural units IA.

Figure 5A:
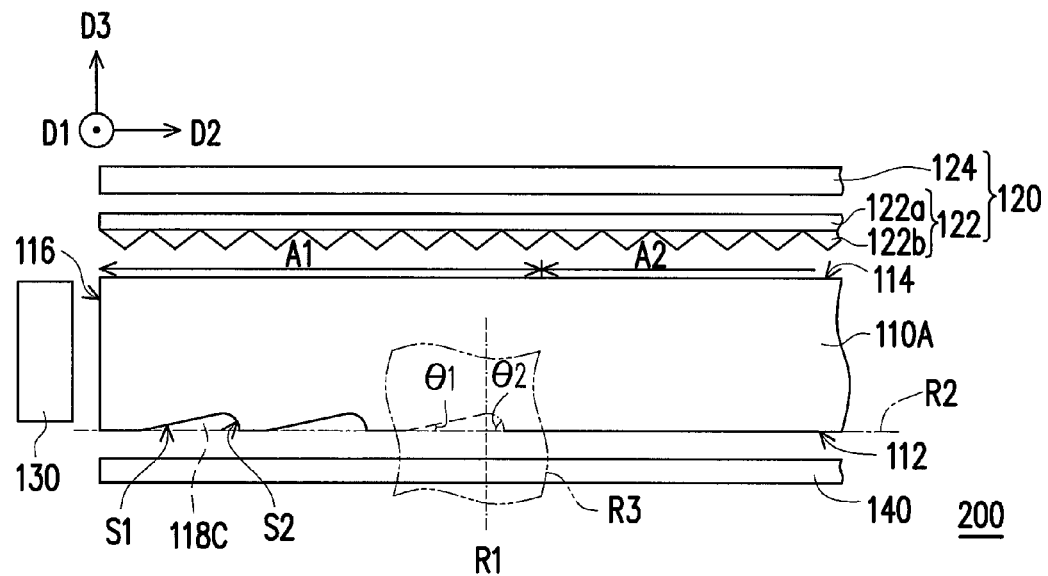
FIG. 5A is a partial cross-sectional view of a backlight module according to a second embodiment of the invention.
Figure 5B:
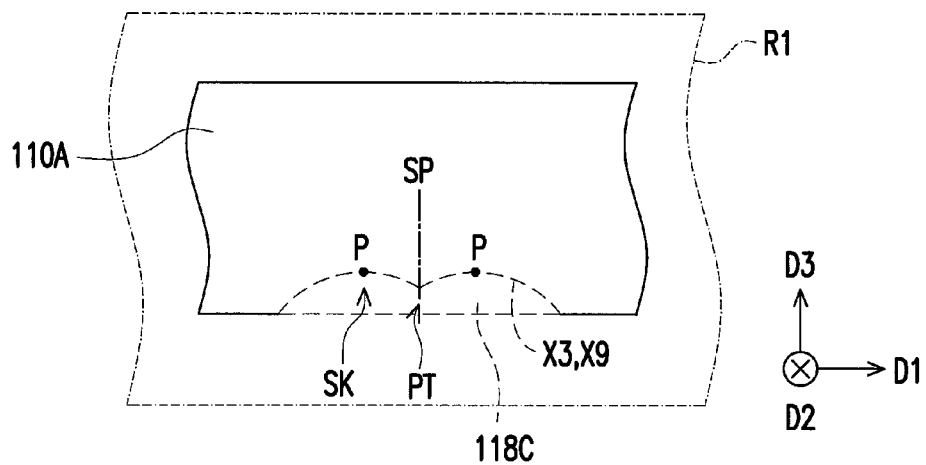
FIG. 5B is a partial cross-sectional view of a light guide plate of FIG. 5A on the first reference plane.

FIG. 5A is a partial cross-sectional view of a backlight module according to a second embodiment of the invention. FIG. 5B is a partial cross-sectional view of a light guide plate of FIG. 5A on the first reference plane. Referring to FIG. 5A and FIG. 5B, the backlight module 200 of the embodiment is similar to the backlight module 100 of FIG. 1A, where the same components are denoted by the same referential numbers, and details thereof are not repeated. A main difference there between is that the microstructure 118C of the embodiment is recessed into the bottom surface 112 of the light guide plate 110A, and the first surface S1 of the microstructure 118C recessed into the bottom 112 is located between the first light incident surface 116 and the second surface S2. Moreover, a section line X3 of the first surface S1 of at least one microstructure 118C recessed into the bottom surface 112 on the first reference plane R1 has at least two depressions SK and at least one protrusion PT.

The optical film 120, for example, includes an inverse prism sheet 122. The inverse prism sheet 122 has a substrate 122a and a plurality prisms 122b parallel to each other, where a longitudinal direction of the prisms 122b is parallel to the first direction D1. Each of the prisms 122b is located between the light emitting surface 114 and the substrate 122a. Further, each of the prisms 122b protrudes towards the light guide plate 110, and a vertex θ3 (shown in FIG. 1A) of each prism 122b is, for example, between 60 degrees and 70 degrees. The optical film 120 may further include a diffusion sheet 124 for diffusing the light beam B come from the inverse prism sheet 122, such that the light beam B emitted from the diffusion sheet 124 has a diffusion effect. In other words, the diffusion sheet 124 is used for improving light emitting uniformity of the backlight module 100. In another embodiment, the diffusion sheet 124 can be replaced by a double brightness enhanced film (DBEF). The DBEF is, for example, Vikuiti™ dual brightness enhancement film-embossed (DBEF-E) or Vikuiti™ dual brightness enhancement film II (DBEF-II), etc. of 3M company.

Figure 6:
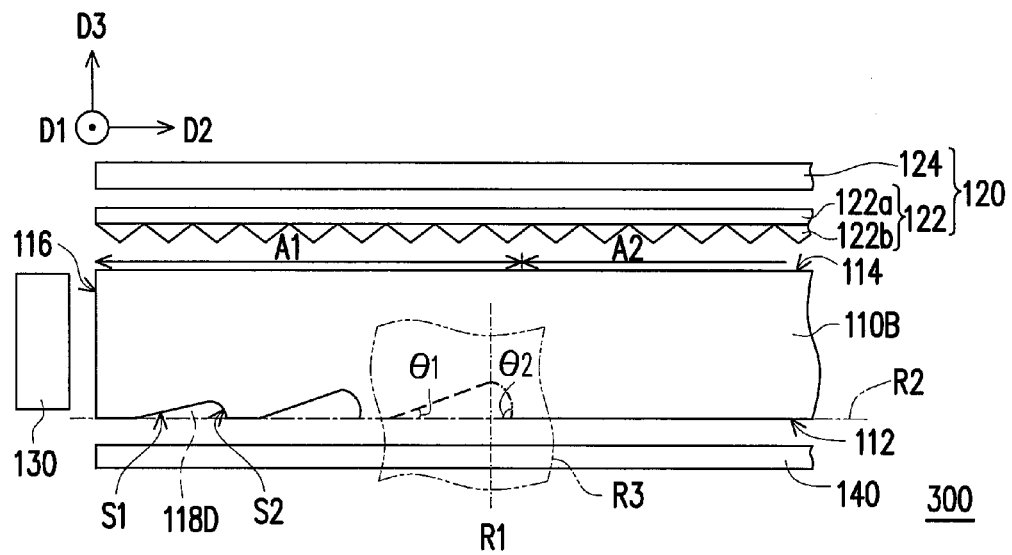
FIG. 6 is a partial cross-sectional view of a backlight module according to a third embodiment of the invention.

FIG. 6 is a partial cross-sectional view of a backlight module according to a third embodiment of the invention. Referring to FIG. 6, the backlight module 300 of the embodiment is similar to the backlight module 200 of FIG. 5A, where the same components are denoted by the same referential numbers, and details thereof are not repeated. A main difference there between is that in the light guide plate 110B of the embodiment, sizes of the microstructures 118D are increased from the first light incident surface 116 along a direction from the first light source 130 to the first light incident surface 116 (i.e. the second direction D2). However, the invention is not limited thereto, in other embodiments, the sizes of the microstructures 118 protruding out of the bottom surface 112 shown in FIG. 1A can also be increased from the first light incident surface 116 along the direction from the first light source 130 to the first light incident surface 116 (i.e. the second direction D2).

Figure 7A:
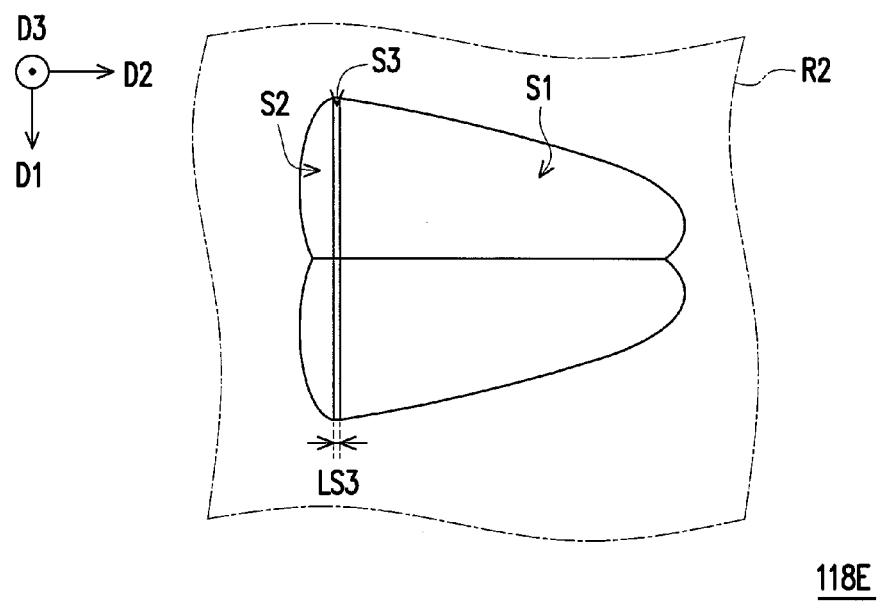
FIG. 7A is a top view of a microstructure according to an embodiment of the invention.
Figure 7B:
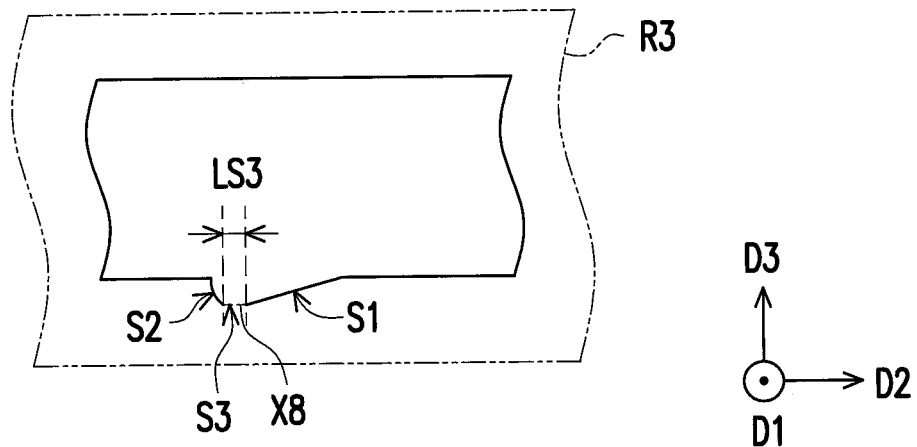
FIG. 7B is a partial cross-sectional view of a type of the microstructure of FIG. 7A on a third reference plane.
Figure 7C:
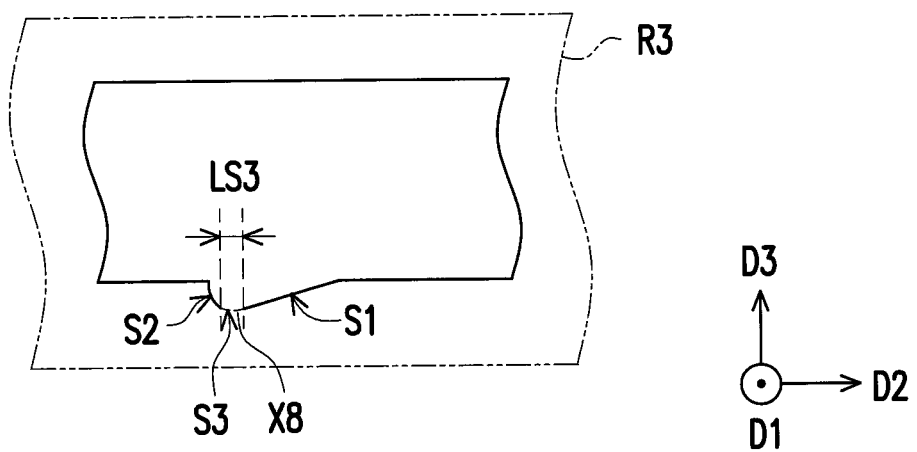
FIG. 7C is a partial cross-sectional view of another type of the microstructure of FIG. 7A on the third reference plane.

FIG. 7A is a top view of a microstructure according to an embodiment of the invention. FIG. 7B is a partial cross-sectional view of a type of the microstructure of FIG. 7A on the third reference plane. FIG. 7C is a partial cross-sectional view of another type of the microstructure of FIG. 7A on the third reference plane. Referring to FIG. 7A to FIG. 7C, the microstructure 118E of the embodiment further has a connection surface S3. The connection surface S3 is connected between the first surface S1 and the second surface S2, and a section line X8 of the connection surface S3 on the third reference plane R3 is a straight line (referring to FIG. 7B) or a curve (referring to FIG. 7C). Moreover, a length LS3 of the connection surface S3 along the second direction D2 is between 0 μm and 20 μm.

The microstructures 118E can be applied to the structure of FIG. 1A or FIG. 5A. When the microstructures 118E are recessed into the bottom surface 112, a section line X9 (shown in FIG. 5B) of the connection surface S3 of the microstructure 118E on the first reference plane R1 has at least two depressions SK and at least one protrusion PT. On the other hand, when the microstructures 118E protrude out of the bottom surface 112, the section line X9 (referring to FIG. 1C) of the connection surface S3 of the microstructure 118E on the first reference plane R1 has at least two protrusions PT and at least one depression SK. Moreover, the microstructure 118E can also include three structural units I having the same shape and size as that shown in FIG. 2B, or include a plurality of first structural units IA and at least one second structural unit IB as that shown in FIG. 3 and FIG. 4.

Figure 8A:
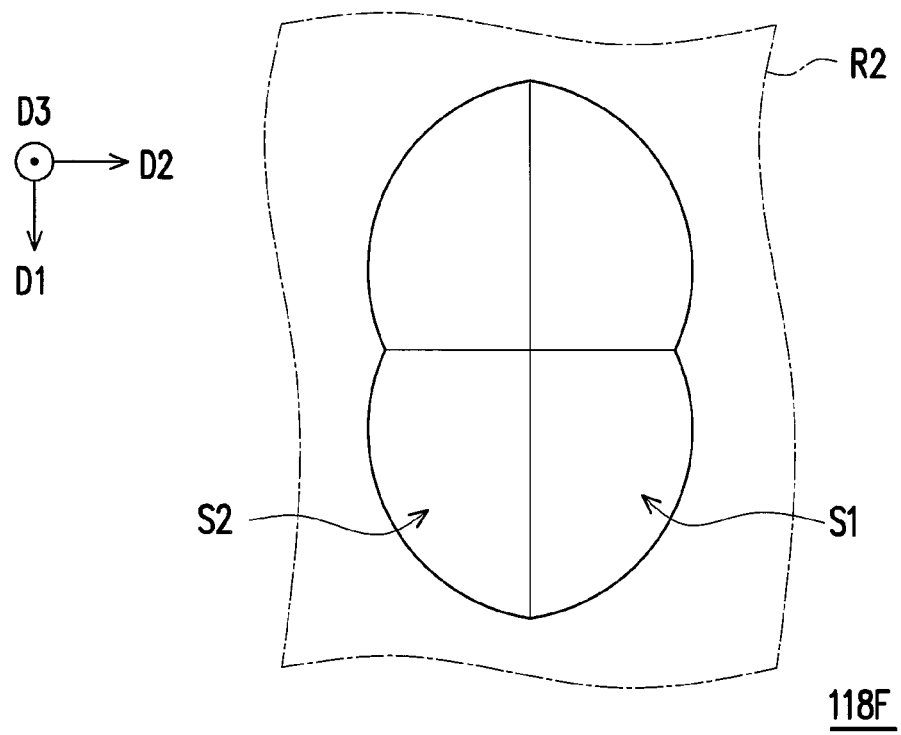
FIG. 8A is a top view of another microstructure according to an embodiment of the invention.
Figure 8B:
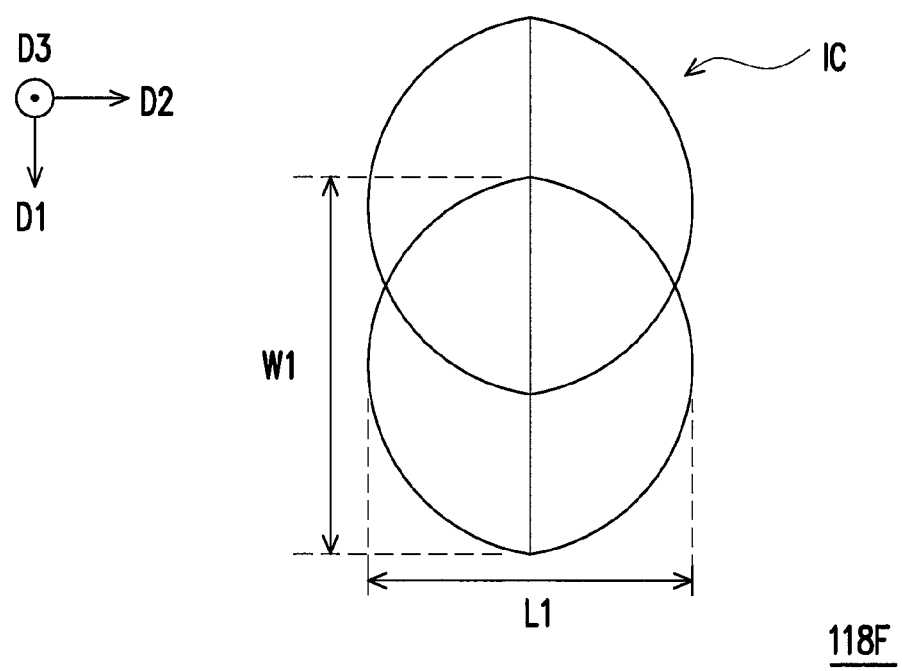
FIG. 8B is a decomposition view of the microstructure of FIG. 8A.

FIG. 8A is a top view of another microstructure according to an embodiment of the invention. FIG. 8B is a decomposition view of the microstructure of FIG. 8A. Referring to FIG. 8A and FIG. 8B, the microstructure 118F of the embodiment is similar to the microstructure 118 of FIG. 1A to FIG. 1D, where a radius of curvature of a section line of the microstructure 118F on the first reference plane R1, a width W1 of each structural unit IC along the first direction D1, a length L1 of each structural unit IC along the second direction D2, a thickness (not shown) of each structural unit IC along the third direction D3 or a distance between center points of two adjacent structural units IC (i.e. the distance D between two adjacent peak points P in FIG. 1C) may refer to related descriptions of FIG. 1A to FIG. 1D.

A main difference is that the first surface S1 and the second surface S2 of the microstructure 118F of the embodiment are symmetric to each other. Therefore, under the structure of FIG. 1A or FIG. 5A, the first included angle θ1 between the first surface S1 of each microstructure 118F and the second reference plane R2 within the light guide plate 110 (or the light guide plate 110A) and the second included angle θ2 between the second surface S2 and the second reference plane R2 within the light guide plate 110 (or the light guide plate 110A) are respectively between 0 degree and 20 a degrees.

Figure 9:
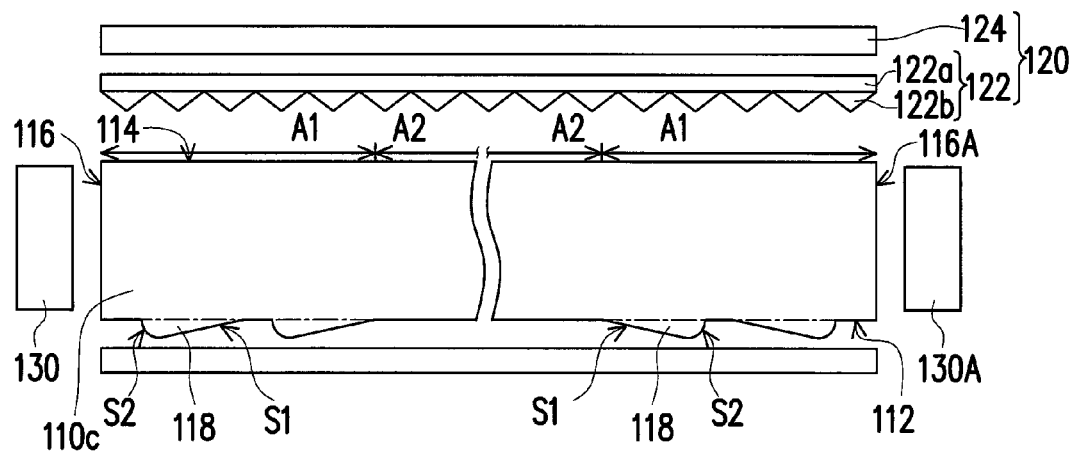
FIG. 9 is a cross-sectional vide of a backlight module according to a fourth embodiment of the invention.

FIG. 9 is a cross-sectional vide of a backlight module according to a fourth embodiment of the invention. Referring to FIG. 9, the backlight module 400 of the embodiment is similar to the backlight module 100 of FIG. 1A, where the same components are denoted by the same referential numbers, and details thereof are not repeated. A main difference there between is that the light guide plate 110C of the embodiment further includes a second light incident surface 116A. The second light incident surface 116A is opposite to the first light incident surface 116, and the second light incident surface 116A is connected to the bottom surface 112 and the light emitting surface 114. Moreover, the backlight module 400 further includes a second light source 130A located beside the second light incident surface 116A. Moreover, the non-visual area A1 surrounds the visual area A2, where the second surface S2 of the microstructure 118 located between the first light incident surface 116 and the visual area A2 and protruding out of the bottom surface 112 is located between the first light incident surface 116 and the first surface S1, and the second surface S2 of the microstructure 118 located between the second light incident surface 116A and the visual area A2 and protruding out of the bottom surface 112 is located between the second light incident surface 116A and the first surface S1. Under the structure of dual light incident surfaces, the microstructures 118 can also be recessed into the bottom surface 112 (i.e. the pattern of the microstructure 118C of FIG. 5A is adopted), where the first surface S1 of the microstructure 118C located between the first light incident surface 116 and the visual area A2 and recessed into the bottom surface 112 is located between the first light incident surface 116 and the second surface S2, and the first surface S1 of the microstructure 118C located between the second light incident surface 116A and the visual area A2 and recessed into the bottom surface 112 is located between the second light incident surface 116A and the second surface S2.

Figure 10A:
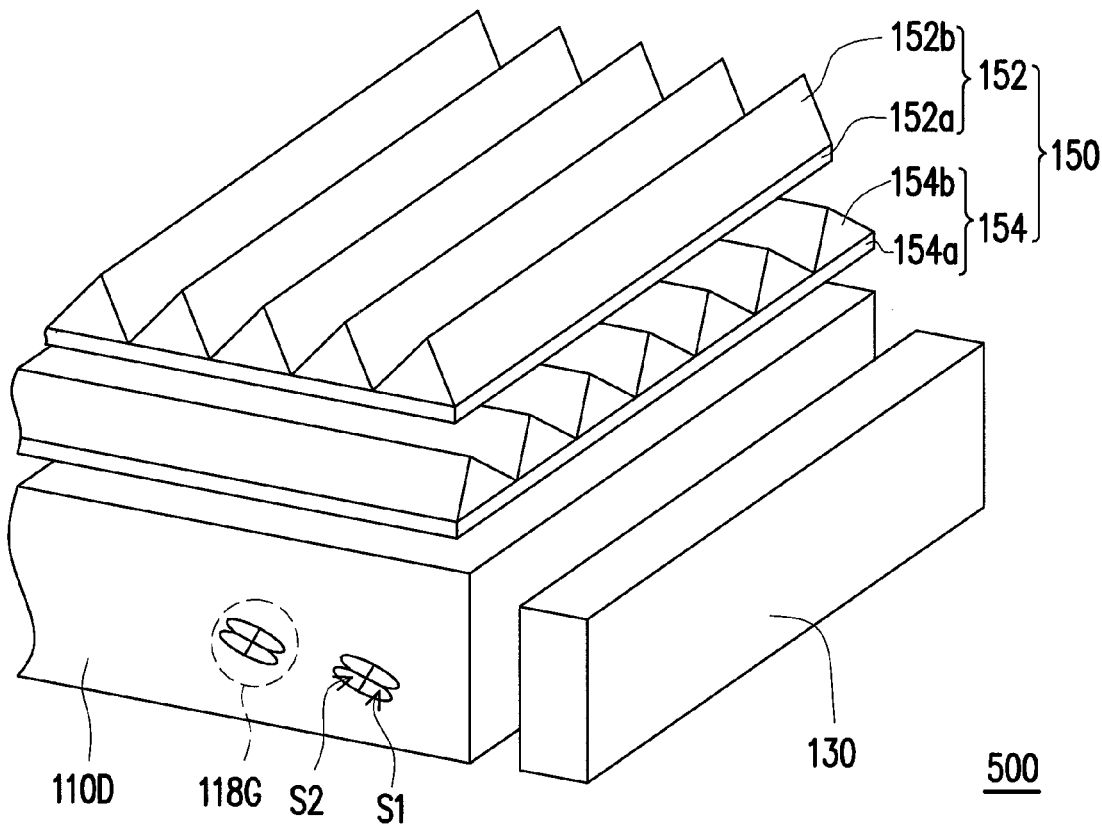
FIG. 10A is a partial three-dimensional view of a backlight module according to a fifth embodiment of the invention.
Figure 10A:
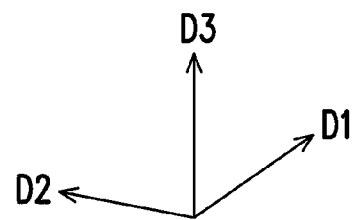
Figure 10B:
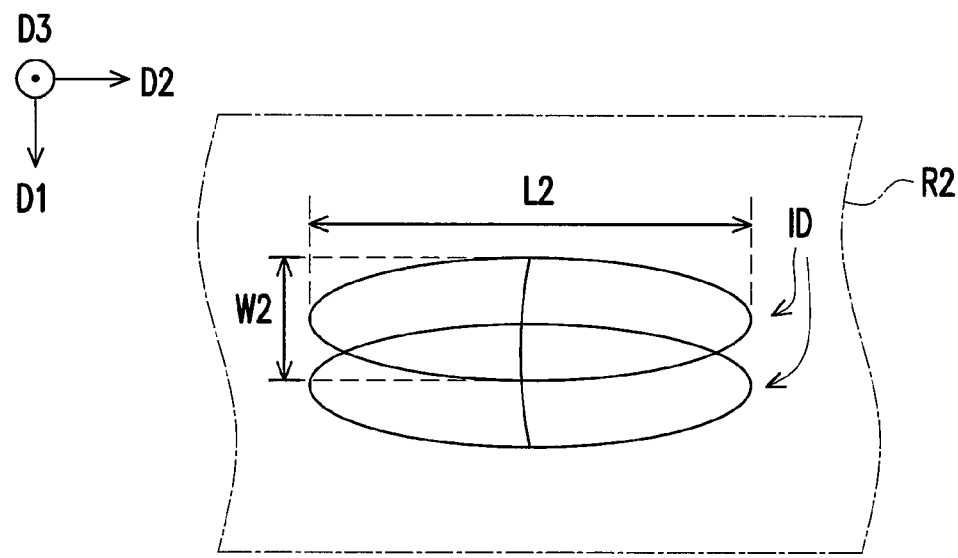
FIG. 10B is a decomposition view of a microstructure of FIG. 10A.
Figure 10C:
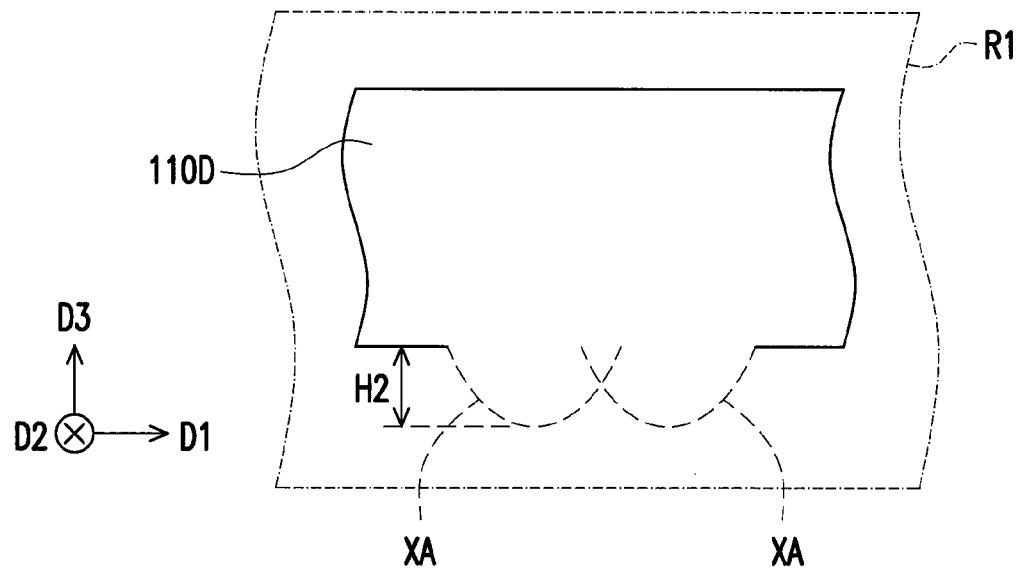
FIG. 10C is a partial cross-sectional view of a light guide plate of FIG. 10A on the first reference plane.

FIG. 10A is a partial three-dimensional view of a backlight module according to a fifth embodiment of the invention. FIG. 10B is a decomposition view of a microstructure of FIG. 10A. FIG. 10C is a partial cross-sectional view of a light guide plate of FIG. 10A on the first reference plane. The backlight module 500 of the embodiment is similar to the backlight module 100 of FIG. 1A, where the same components are denoted by the same referential numbers, and details thereof are not repeated. A main difference there between is that the optical film 150 of the embodiment includes a first prism sheet 152 and a second prism sheet 154 overlapped to the first prism sheet 152. The first prism sheet 152 has a first substrate 152a and a plurality of first prisms 152b parallel to each other, where a longitudinal direction of the first prism 152b is parallel to the first direction D1. The second prism sheet 154 has a second substrate 154a an a plurality of second prisms 154b parallel to each other, where a longitudinal direction of the second prism 154b is perpendicular to the first direction D1, and the first substrate 152a is located between the first prisms 152b and the second prism sheet 154. The second prisms 154b are located between the second substrate 154a and the first prism sheet 152.

Considering collocation of the light guide plate 110D and the first prism sheet 152 and the second prism sheet 154 on a light emitting direction, the first surface S1 and the second surface S2 of each microstructure 118G is symmetric to each other, and a radius of curvature of a section line (a curve XA) of each structural unit ID of the microstructure 118G on the first reference plane R1 is, for example, between 40 μm and 60 μm. Moreover, a width W2 of each structural unit ID along the first direction D1 is, for example, between 40 μm and 60 μm, a length L2 of each structural unit ID along the second direction D2 is, for example, between 230 μm and 250 μm, and a thickness H2 of each structural unit ID along the third direction D3 is, for example, between 0 μm and 20 μm, Moreover, the backlight module 500 of the embodiment may further include at least one of the reflective sheet 140 and the diffusion sheet 124 shown in FIG. 1A.

It should be noticed that in the aforementioned embodiments, although the bottom surfaces 112 of the light guide plates 110, 110A, 110B, 110C and 110D are all parallel to the light emitting surfaces 114, namely, the distance between the bottom surface 112 and the light emitting surface 114 is a constant, the invention is not limited thereto. In another embodiment, the light guide plate 110 can be a partial wedge light guide plate. Namely, at least a part of the bottom surface 112 is oblique relative to the light emitting surface 114, and the distance between the bottom surface 112 and the light emitting surface 114 is changed along with positions.

Moreover, in the aforementioned embodiments, although the microstructures all protrude out of the bottom surface of the light guide plate (shown in FIG. 1A and FIG. 9), or are recessed into the bottom surface of the light guide plate (shown in FIG. 5A and FIG. 6), the invention is not limited thereto. In another embodiment, the microstructures may partially protrude out of the bottom surface of the light guide plate and are partially recessed into the bottom surface of the light guide plate. Moreover, the microstructures of each light guide plate can be one type or at least two types of the microstructures shown in FIG. 1D, FIG. 2A, FIG. 3, FIG. 4, FIG. 6, FIG. 7A, FIG. 8A and FIG. 10.

In summary, the embodiments of the invention may achieve at least one of the following advantages or effects. Based on the design of symmetric concave and convex curved surfaces of each of the microstructures of the backlight module along the first direction, diffusibility and uniformity of light beam along the first direction are enhanced, so as to mitigate the mura phenomenon of the optical film at a region close to the light source. Moreover, through a parameter design of each microstructure (for example, a radius of curvature, a length and a width, etc.), the microstructures of the invention can be applied to the positive prism structure or inverse prism structure.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
a light guide plate, having a bottom surface, a light emitting surface, a first light incident surface and a plurality of microstructures, wherein the bottom surface is opposite to the light emitting surface, the first light incident surface is connected to the bottom surface and the light emitting surface, each of the microstructures is recessed into or protrudes out of the bottom surface, and comprises at least two structural units, wherein a section line of each of the structural units on a first reference plane parallel to the first light incident surface is a curve, and the curve has a peak point, the peak point is a tangent point of the curve and a second reference plane parallel to the light emitting surface, and a distance between two peak points of two adjacent structural units of each microstructure along a first direction parallel to the first reference plane and the light emitting surface is greater than 0 and is smaller than a half of a total width of the two structural units along the first direction, and each of the microstructures has a symmetric plane perpendicular to the light emitting surface and perpendicular to the first light incident surface;
at least one optical film, located on the light emitting surface; and a first light source, located beside the first light incident surface.

2. The backlight module as claimed in claim 1, wherein the light emitting surface has a non-visual area connected to the first light incident surface and a visual area connected to the non-visual area, the non-visual area is located between the first light incident surface and the visual area, and the microstructures are at least located under the non-visual area.

3. The backlight module as claimed in claim 2, wherein at least one microstructure is located under the visual area.

4. The backlight module as claimed in claim 1, wherein the structural units of at least one microstructure comprise a plurality of first structural units and at least one second structural unit, and the first structural units have a same size, and a size of the at least one second structural unit is different to the size of the first structural units.

5. The backlight module as claimed in claim 1, wherein each of the microstructures has a first surface and a second surface, and the first surface and the second surface of at least one microstructure are located at two sides of the first reference plane.

6. The backlight module as claimed in claim 5, wherein the second surface of at least one microstructure is asymmetric to the first surface thereof.

7. The backlight module as claimed in claim 6, wherein a first included angle between the first surface of at least one microstructure and the second reference plane within the light guide plate is between 0 degree and 20 degrees, and a second included angle between the second surface and the second reference plane within the light guide plate is between 0 degree and 90 degrees.

8. The backlight module as claimed in claim 5, wherein the first surface of the microstructure recessed into the bottom surface is located between the first light incident surface and the second surface, and the second surface of the microstructure protruding out of the bottom surface is located between the first light incident surface and the first surface.

9. The backlight module as claimed in claim 5, wherein a section line of the first surface of at least one microstructure on a third reference plane perpendicular to the first light incident surface and perpendicular to the light emitting surface is a straight line, and a section line of the second surface on the third reference plane is a straight line or a curve.

10. The backlight module as claimed in claim 5, wherein a section line of the first surface of at least one microstructure recessed into the bottom surface on the first reference plane has at least two depressions and at least one protrusion, and a section line of the first surface of at least one microstructure protruding out of the bottom surface on the first reference plane has at least two protrusions and at least one depression.

11. The backlight module as claimed in claim 5, wherein a section line of the first surface of the at least one microstructure on the second reference plane has at least two protrusions and at least one depression, and a section line of the second surface of the at least one microstructure on the second reference plane has at least two protrusions and at least one depression.

12. The backlight module as claimed in claim 5, wherein the first surface of the at least one microstructure is connected to the second surface thereof.

13. The backlight module as claimed in claim 5, wherein at least one microstructure has a connection surface, the connection surface is connected between the first surface and the second surface, and a section line of the connection surface on a third reference plane perpendicular to the first light incident surface and perpendicular to the light emitting surface is a straight line or a curve, a section line of the connection surface of at least one microstructure recessed into the bottom surface on the first reference plane has at least two depressions and at least one protrusion, and a section line of the connection surface of at least one microstructure protruding out of the bottom surface on the first reference plane has at least two protrusions and at least one depression.

14. The backlight module as claimed in claim 13, wherein a length of the connection surface along a second direction perpendicular to the first light incident surface is between 0 μm and 20 μm.

15. The backlight module as claimed in claim 5, wherein the first surface and the second surface of each of the microstructures respectively comprise a plurality of curved surfaces connected to each other, and the first surface and the second surface respectively have a symmetric surface perpendicular to the light emitting surface and perpendicular to the first light incident surface.

16. The backlight module as claimed in claim 5, wherein the light guide plate further includes a second light incident surface, the second light incident surface is opposite to the first light incident surface, and the second light incident surface is connected to the bottom surface and the light emitting surface, the backlight module further comprises a second light source located beside the second light incident surface, the light emitting surface has a visual area and a non-visual area connected to the visual area, the non-visual area surrounds the visual area, wherein the first surface of the microstructure located between the first light incident surface and the visual area and recessed into the bottom surface is located between the first light incident surface and the second surface, the second surface of the microstructure located between the first light incident surface and the visual area and protruding out of the bottom surface is located between the first light incident surface and the first surface, the first surface of the microstructure located between the second light incident surface and the visual area and recessed into the bottom surface is located between the second light incident surface and the second surface, and the second surface of the microstructure located between the second light incident surface and the visual area and protruding out of the bottom surface is located between the second light incident surface and the first surface.

17. The backlight module as claimed in claim 1, wherein sizes of the microstructures are increased from the first light incident surface along a direction from the first light source to the first light incident surface.

18. The backlight module as claimed in claim 1, wherein the first light source comprises a plurality of light emitting diodes arranged along the first direction, and a distribution density of the microstructures located in front of each of the light emitting diodes is greater than a distribution density of the microstructures located in front of a gap between two adjacent light emitting diodes.

19. The backlight module as claimed in claim 1, wherein the first light source comprises a plurality of light emitting diodes arranged along the first direction, and a distribution density of the microstructures located in front of each of the light emitting diodes is smaller than a distribution density of the microstructures located in front of a gap between two adjacent light emitting diodes.

20. The backlight module as claimed in claim 1, wherein the light guide plate further comprises a lenticular lens structure located at the light emitting surface, the lenticular lens structure has a plurality of lenticular lenses parallel to each other, wherein a longitudinal direction of the lenticular lenses is perpendicular to the first light incident surface, and each of the lenticular lenses protrudes towards the optical film.

21. The backlight module as claimed in claim 1, wherein the at least one optical film comprises an inverse prism sheet, the inverse prism sheet has a substrate and a plurality of prisms parallel to each other, wherein a longitudinal direction of the prisms is parallel to the first direction, and each of the prisms is located between the light emitting surface and the substrate.

22. The backlight module as claimed in claim 21, wherein a width of each of the structural units along the first direction is between 40 µm and 80 µm, a length of each of the structural units along a second direction perpendicular to the first light incident surface is between 60 µm and 80 µm, and a thickness of each of the structural units along a third direction perpendicular to the light emitting surface is between 0 µm and 20 µm.

23. The backlight module as claimed in claim 21, wherein a radius of curvature of the curve is between 70 µm and 210 µm.

24. The backlight module as claimed in claim 1, wherein the at least one optical film comprises a first prism sheet and a second prism sheet overlapped to the first prism sheet, the first prism sheet has a first substrate and a plurality of first prisms parallel to each other, wherein a longitudinal direction of the first prisms is parallel to the first direction, the second prism sheet has a second substrate and a plurality of second prisms parallel to each other, wherein a longitudinal direction of the second prisms is perpendicular to the first direction, and the first substrate is located between the first prisms and the second prism sheet, and the second prisms are located between the second substrate and the first prism sheet.

25. The backlight module as claimed in claim 24, wherein a width of each of the structural units along the first direction is between 40 µm and 60 µm, a length of each of the structural units along the second direction perpendicular to the first light incident surface is between 230 µm and 250 µm, and a thickness of each of the structural units along a third direction perpendicular to the light emitting surface is between 0 µm and 20 µm.

26. The backlight module as claimed in claim 24, wherein a radius of curvature of the curve is between 40 µm and 60 µm.

* * * * *